United States Patent Office 2,807,598
Patented Sept. 24, 1957

2,807,598

COMPOSITION COMPRISING A THERMOPLASTIC HIGH POLYMERIC MATERIAL AND AN ESTER PLASTICIZER

Friedrich Hoelscher, Otterstadt, Germany, assignor to Badische Anilin- & Soda-Fabrik Aktiengesellschaft, Ludwigshafen (Rhine), Germany No Drawing. Application June 22, 1954, Serial No. 438,625

Claims priority, application Germany June 26, 1953

12 Claims. (Cl. 260—31.2)

This invention relates to new plasticizers and to compositions of matter comprising a thermoplastic plastic and a new plasticizer.

I have found that difficultly volatile esters of para-chlor-gamma-phenylbutyric acid are excellent plasticizers for thermoplastic plastics, in particular for halogen-containing thermoplastic plastics.

Para-chlor-gamma-phenylbutyric acid can be produced by reaction of chlorbenzene and butyrolactone in the presence of Friedel-Crafts' catalysts and can be esterified in the usual way. It is advantageous to remove the water formed during the esterification; this is preferably effected by removing the water by circulation with the aid of aromatic hydrocarbons or halogenated aliphatic hydrocarbons. The difficultly volatile esters of para-chlor-gamma-phenylbutyric acid can contain monohydric or polyhydric alcohols as alcoholic components. It is especially suitable to use omega.omega'-glycols, such as 1.4-butanediol, 1.6-hexanediol and 1.10-decanediol or their monoethers. Polyethylene glycols, such as di-, tri- or tetra-ethylene glycol may also be used. Among suitable monohydric alcohols there may be mentioned especially those containing between 7 and 10 carbon atoms for example 2-ethylhexanol alcohols obtained by the oxonation of $C_6$–$C_9$ olefins and mixtures of such alcohols. Dodecyl alcohol and benzyl alcohol may also be used. Among higher polyhydric alcohols there may be mentioned glycerine, butanetriol, trimethylolpropane, hexanetriol and pentaerythritol.

The difficultly volatile esters of para-chlor-gamma-phenylbutyric acid, which preferably should be liquids having a boiling point above 280° C., are especially suitable for plasticizing polymers and copolymers of vinyl chloride or vinylidene chloride. With these monomers, other vinyl compounds such as vinyl acetate, acrylonitrile, acrylic acid esters or methacrylic acid esters and the like may be copolymerised into the plastics to be plasticized. The new plasticizers may also be used for other polymers, as for example for polyvinyl acetate, polyvinyl chloracetate, polyacrylic acid esters or also for cellulose esters or ethers, e. g. benzyl cellulose.

The plasticizers can be incorporated with the thermoplastic plastics or with the solutions or dispersions of the plastics by mixing, for example on rollers, kneaders and the like, at room temperature or moderately elevated temperature. As a rule 20 to 60 percent by weight of plasticizer, with reference to the weight of thermoplastic plastic, are used. The new plasticizers can be used together with other known plasticizers.

The plasticized plastics are characterised by excellent mechanical properties and good stability to cold and heat. They may be used for many purposes and may serve for example for the production of foils, shaped articles of all kinds, electrical insulation, coatings, coverings and the like.

The following examples will further illustrate this invention but the invention is not restricted to these examples. The parts are parts by weight.

Example 1

A mixture of 397 parts of para-chlor-gamma-phenylbutyric acid, 260 parts of 2-ethylhexanol, 1500 parts of toluene and 7 parts of para-toluenesulfonic acid is kept boiling vigorously for about 8 hours in a stirring vessel provided with a reflux condenser and a separator; about 36 parts of water thus collect in the separator. Other esterification catalysts, such as sulfuric acid, phosphoric acid, naphthalene sulfonic acid or acid-reacting substances with large surfaces, such as ion-exchange compounds, may be used instead of para-toluene-sulfonic acid. After the addition of 30 parts of decolourising carbon, the contents of the vessel are boiled for a further 2 hours; the carbon is then removed by filtration and the cooled solution is washed in the usual way first with 5 percent soda solution and then several times with water until neutral. After distilling off the toluene in vacuo, 585 parts of the pale yellowish coloured para-chlor-gamma-phenylbutyric-acid-2-ethylhexyl ester are obtained.

Mixtures of this plasticizer and polyvinyl chloride may be worked up into foils having the following properties:

| | | |
|---|---|---|
| Parts of polyvinyl chloride | 60 | 75 |
| Parts of para-chlor-gamma-phenylbutyric acid-2-ethyl hexyl ester | 40 | 25 |
| Tensile strength in kg. per sq. cm. | 167 | 258 |
| Breaking elongation, percent | 380 | 240 |
| Resistance to cold | −35° to −40° C. | −20° to −25° C. |
| Specific resistance (ohms per cm.) | $1.10^{11}$ | $7.10^{13}$ |

Example 2

An ester is prepared from a mixture of 596 parts of para-chlor-gamma-phenylbutyric acid, and 140 parts of butanediol-(1.4) in the manner described in Example 1. The esterification is carried out in the presence of 2000 parts of toluene and 7.5 parts of para-toluenesulfonic acid. 652 parts of the pale yellowish coloured bis-para-chlor-gamma-phenylbutyric acid 1.4-butanediol esters are obtained.

The following values are measured on foils prepared from polyvinyl chloride and the said plasticizer:

| | | |
|---|---|---|
| Parts of polyvinyl chloride | 60 | 75 |
| Parts of plasticizer | 40 | 25 |
| Tensile strength in kg. per sq. cm.: | | |
| (a) Before ageing | 210 | 305 |
| (b) After ageing | 232 | 323 |
| Breaking elongation, percent: | | |
| (a) Before ageing | 380 | 235 |
| (b) After ageing | 370 | 230 |
| Resistance to cold: | | |
| (a) Before ageing | −20° to −25° C. | −5° to −10° C. |
| (b) After ageing | −15° to −20° C. | 0 to −5° C. |
| Specific resistance in ohms per cm. | $5.10^{10}$ | $6.10^{13}$ |

The ageing is effected by heating at 90° C. for 11 days.

Example 3

455 parts of the pale yellowish coloured bis-para-chlor-gamma-phenylbutyric acid-1.6-hexanediol ester are obtained, according to the method described in Example 1, by esterifying a mixture of 397 parts of para-chlor-gamma-phenylbutyric acid, 118 parts of 1.6-hexanediol, 1000 parts of toluene and 5 parts of para-toluenesulfonic acid for 10 hours, decolourising with decolourising carbon, shaking up with dilute soda solution, washing with water and removing the solvent.

The resistance to cold of a foil of 60 parts of polyvinyl chloride and 40 parts of the said ester is determined as −35° C. before ageing and −30° C. after ageing.

Example 4

554 parts of the pale yellowish coloured butyl-glycol-para-chlor-gamma-phenylbutyrate are obtained, by the method according to Example 1, by esterifying a mixture of 397 parts of para-chlor-gamma-phenylbutyric acid, 122 parts of the monobutyl ether of ethylene glycol, 1000 parts of benzene and 4 parts of para-toluensulfonic acid for 9 hours, decolourising with decolourising carbon, washing with soda solution and then with water and removal of the solvent by distillation.

The resistance to cold of a foil of 60 parts of polyvinyl chloride and 40 parts of the said ester is determined as −30° to −35° C. before ageing and −25° to −30° after ageing.

Example 5

327 parts of the viscous para-chlorphenylglycol-(para-chlor-gamma-phenyl)-butyrate are obtained by the method described in Example 1 by esterifying a mixture of 172.5 parts of the mono-para-chlorphenyl ether of ethylene glycol, 198.5 parts of para-chlor-gamma-phenylbutyric acid, 600 parts of ethylene chloride and 4 parts of concentrated sulfuric acid for 12 hours, decolourising with decolourising carbon, washing with soda solution, washing with water and removal of the solvent by distillation.

The resistance to cold of a foil of 60 parts of polyvinyl chloride and 40 parts of the said ester is determined as −20° to −25° C. before ageing and −15° to −20° C. after ageing.

Example 6

583 parts of glycerine-tri-para-chlor-gamma-phenylbutyrate are obtained as a viscous brownish coloured liquid by the method described in Example 1 by esterifying a mixture of 92 parts of glycerine, 595 parts of para-chlor-gamma-phenylbutyric acid, 1000 parts of ethylene chloride and 7 parts of para-toluenesulfonic acid and working up according to Example 1.

The ester is eminently suitable for plasticizing polyvinyl acetate. Thus by emulsifying 500 parts of the said ester into 2220 parts of a polyvinyl acetate dispersion containing 45 parts of polymer per 100 parts by stirring for 3 hours with a uniformly distributed supply of the plasticizer at a temperature of the mixture of 80° to 85° C., there is obtained a dispersion containing 55 parts of plasticized polymer per 100 parts from which by drying at room temperature in known manner there is obtained a film which is distinguished by clarity, high flexibility and improved water-repellency and resistance to cold as compared with corresponding films prepared with the use of dibutyl phthalate.

Example 7

With a mixture of 272 parts of pentaerythritol, 1588 parts of para-chlor-gamma-phenylbutyric acid, 2000 parts of toluene and 19 parts of concentrated sulfuric acid, the esterification reaction according to Example 1 leads to 1613 parts of a pale brownish coloured viscous pentaerythritol-tetra-para-chlor-gamma-phenyl-butyrate.

The ester is eminently suitable for plasticizing polyvinyl acetate and copolymers of vinyl chloride and vinyl acetate or polymers or copolymers of vinylidene chloride by the method described in Example 6.

Example 8

216 parts of benzyl alcohol are esterified in the manner described in Example 1 with 397 parts of para-chlor-gamma-phenylbutyric acid in the presence of 1000 parts of ethylene chloride and 6 parts of para-toluenesulfonic acid. After working up in the manner described in Example 1, 536 parts of a pale yellow coloured ester are obtained.

Benzyl-para-chlor-gamma-phenylbutyrate is especially suitable for plasticizing cellulose nitrate films by reason of its high stability to light, its good gelatinising power and insensitivity to water, and for the production of foils of polyvinyl chloride or vinylchloride copolymers by reason of its good resistance to cold.

I claim:

1. A composition of matter comprising a polymer of vinylchloride and as plasticizer an ester of para-chlor-gamma-phenylbutyric acid having a boiling point above 280° C., the content of the said ester in this composition being from 20 to 60 percent with reference to the weight of the thermoplastic material.

2. A composition of matter as claimed in claim 1 containing as plasticizer a para-chlor-gamma-phenylbutyric-acid ester of a fully saturated aliphatic alcohol having between 7 and 10 carbon atoms.

3. A composition of matter as claimed in claim 1 containing the para-chlor-gamma-phenylbutyric-acid-2-ethylhexyl ester as plasticizer.

4. A composition of matter as claimed in claim 1 containing the bis-para-chlor-gamma-phenylbutyric acid 1.4-butanediol ester as plasticizer.

5. A composition of matter as claimed in claim 1 containing the para-chlor-gamma-phenylbutyric acid ester of the mono-para-chlor-phenyl ether of ethylene glycol.

6. A composition of matter comprising polyvinyl acetate and as plasticizer from 20 to 60 percent by weight of the glycerine-tri-para-chlor-gamma-phenylbutyric acid ester with reference to the weight of the polyvinyl acetate.

7. A composition of matter comprising polyvinyl acetate and as plasticizer from 20 to 60 percent by weight of the penta-erythritol-tetra-para-chlor-gamma-phenyl-butyric acid ester with reference to the weight of the polyvinyl acetate.

8. A composition of matter comprising a thermoplastic high polymeric material selected from the group consisting of polymers of vinyl chloride, polymers of vinylidene chloride, polyvinyl acetate and cellulose esters and cellulose ethers, and as plasticizer an ester of para-chlor-gamma-phenylbutyric acid having a boiling point above 280° C.

9. A composition of matter as claimed in claim 8 wherein the alcohol forming the ester of para-chlor-gamma-phenyl-butyric acid is a diol.

10. A composition of matter as claimed in claim 8 wherein the alcohol forming the ester of para-chlor-gamma-phenyl-butyric acid is a triol.

11. A composition of matter as claimed in claim 8 wherein the alcohol forming the ester of para-chlor-gamma-phenyl-butyric acid is a tetraol.

12. A composition of matter as claimed in claim 8 wherein the alcohol forming the ester of para-chlor-gamma-phenyl-butyric acid is a monoether of a diol.

References Cited in the file of this patent

UNITED STATES PATENTS 2,648,652    Von Schickh _____ Aug. 11, 1953